March 12, 1963   E. P. BRINKEL   3,080,888
VALVE
Filed April 13, 1961
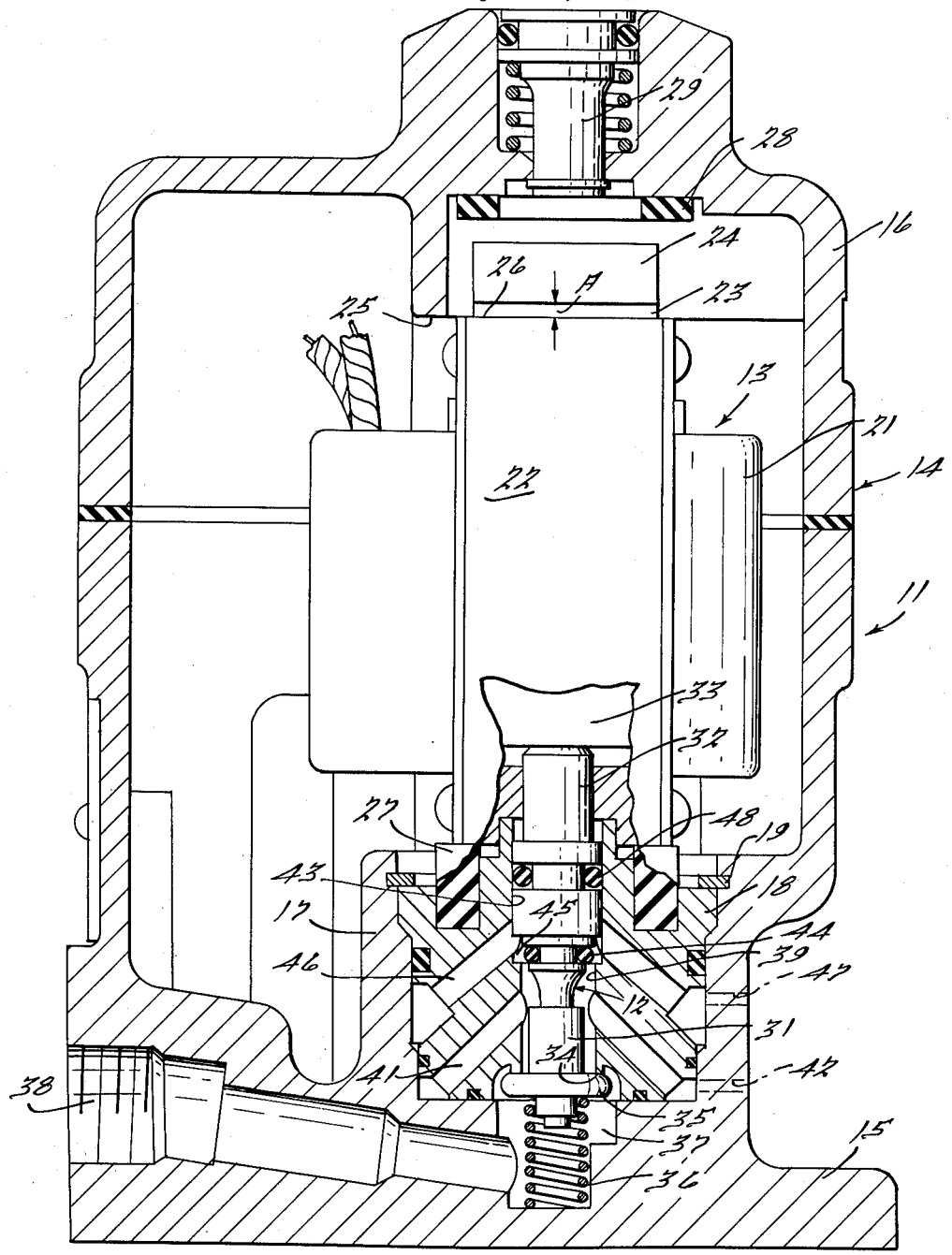
INVENTOR.
Edwin P. Brinkel
BY
Harness, Dickey & Pierce
ATTORNEYS

United States Patent Office 3,080,888
Patented Mar. 12, 1963

3,080,888
VALVE
Edwin Paul Brinkel, Royal Oak, Mich., assignor to Ross Operating Valve Company, Detroit, Mich., a corporation of Michigan
Filed Apr. 13, 1961, Ser. No. 102,829
4 Claims. (Cl. 137—623)

This invention relates to valves, and more particularly to solenoid-operated valves such as pilot valves which are of a normally open type.

It is an object of the present invention to provide a novel and improved solenoid-operated valve which insures proper operating of the solenoid elements at their maximum efficiency despite wear on the parts which may occur after prolonged use, and in which the valve elements will at all times be moved positively to their full opened or closed positions.

Other objects, features, and advantages of the present invention will become apparent from the subsequent description, taken in conjunction with the accompanying drawings.

The FIGURE shows a cross-sectional view in elevation of the improved valve together with a solenoid and housing.

In general terms, the invention comprises a valve for use in conjunction with a T-shaped armature of the type which requires that the head of the T reach a full "homing" position with respect to the core for full efficiency when the solenoid is energized.

The valve is intended to be of a normally open type and includes a spool carrying a poppet-type valve at the end thereof remote from the armature, and a spool-type valve at an intermediate portion of the stem. The spool valve comprises an O-ring carried by the stem and coacting with a cylindrical land carried by the valve body. A sealing member is carried by the valve stem between the spool valve and the armature, the piston area of this sealing member being slightly larger than the effective area of the poppet valve.

Referring more particularly to the drawings, the assembly is generally indicated at 11 and comprises a valve generally indicated at 12 and a solenoid generally indicated at 13, the entire assembly being mounted within a housing generally indicated at 14. Housing 14 includes a lower or base portion 15 and an upper or cover portion 16. Base portion 15 has an upwardly extending internal portion 17 within which is mounted a valve insert 18, the insert being held in place by a snap-ring 19.

Solenoid 13 includes a coil 21 and a core 22 which is of U-shaped construction, coil 21 being disposed between the two upwardly extending legs of the core, only one leg being visible in the figure.

A T-shaped armature 23 has its central portion disposed within coil 22 and its cross head 24 extending outwardly on both sides so as to be disposed over the upwardly extending legs of U-shaped core 22. Only one end of armature cross head 24 is visible in the figure. Cover 16 has an internal downwardly extending shoulder 25 engaging the outer portions of upper core shoulders 26. The cover holds the core down against an annular resilient element 27 mounted on insert 18, thus firmly securing the solenoid assembly 13 within the housing. Member 27 may be of such resiliency as to lift solenoid assembly 13 when cover 16 is removed, thus preventing valve operation by the solenoid. A bumper 28 may be provided within cover 16 to limit upward movement of armature 23 when the solenoid is deenergized. A push button 29 is mounted in the top of cover 16 so that armature 23 may be manually depressed to operate the valve.

Valve 12 includes a valve stem 31 within insert 18, the upper end 32 of this stem being engageable by downwardly extending means 33 from armature 23. A downwardly facing radial or poppet valve seat 34 is provided on insert 18, and the lower end of stem 31 carries a poppet valve 35 engageable with this seat. A spring 36 is disposed in the chamber 37 below poppet valve 35 and urges the valve stem upwardly. Chamber 37 is connected to an exhaust port 38 in housing portion 15.

A bore 39 is provided in insert 18 above valve seat 34, and passages 41 lead from this bore to an outlet or working port indicated schematically at 42. This port may connect with the motor of a main valve (not shown). A bore 43 of somewhat larger diameter than bore 42 is disposed thereabove, and a sealing ring or O-ring 44 is carried by stem 31 and is movable from the chamber 45 formed by bore 43 downwardly into sealing engagement with the upper portion of bore 39 when the solenoid is energized. Passages 46 lead from an inlet port shown schematically at 47 in housing portion 15 through insert 18 to chamber 45. A sealing or O-ring 48 is carried by the upper end of stem 31 within bore 43 in sealing engagement therewith, the effective area of this ring thus being slightly larger than the effective area within valve seat 34.

In operation, the parts will normally be in their open or deenergized position shown in the figure. When in this position, valve 35 will engage seat 34 and valve 44 will be spaced from its seat 39. Fluid will thus flow from inlet port 47 through passages 46, chamber 45 and the upper portion of bore 39 to passages 41 and thus to outlet or working portion 42.

Upon energization of coil 21, cross head 24 of armature 23 will be attracted downwardly. The distance which cross head 24 must travel before it reaches its homing position against the upper surface 26 of core 22 is indicated at A in the figure. This distance may change as the parts wear in or because of the presence of some obstruction, but it is necessary that valve 35 be fully open and valve 44 fully closed when the solenoid is energized, regardless of the exact distance traveled. Armature 23 will push stem 31 downwardly against the action of spring 36, removing valve 35 from seat 34 and causing valve 44 to enter within land 39. Since land 39 comprises a cylindrical bore, the exact distance traveled by sealing ring 44 will not affect the full closing of this valve. Outlet port 42 will thus be connected to exhaust port 38, while inlet port 47 is shut off from the outlet port.

Upon deenergization of coil 21, stem 31 will move upwardly as urged by spring 36 and the inlet pressure on seal 48. As valve 44 leaves seat 39, fluid pressure will pass from chamber 45 into bore 39. Valve 35 will engage seat 34, and the fact that the effective area of seal 48 is slightly greater than that within seat 34 will insure that the fluid pressure will maintain the valve in its upper position. It should be noted that the upward distance traveled by armature 23 when coil 21 is deenergized will have no effect on the full and complete seating of the exhaust valve.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In combination, a solenoid having a core and armature with coacting abutting surfaces, said armature being movable between a deenergized position in which said surfaces are separated and an energized position in which the surfaces are together, a valve comprising a stem aligned with a portion of said armature and movable thereby from a first to a second position when the armature moves to its energized position, a valve body, said stem being movable within said body, a poppet valve carried by said stem, a poppet valve seat on said body and engageable by said poppet valve when the stem is in its first position, a bore in said valve body surrounding said stem and connected with said poppet valve seat, said valve body being further provided with a first chamber on the side of said bore opposite said poppet valve seat and surrounding said stem, a fluid inlet port connected to said chamber, a working port connected to said bore, a second chamber connected to said poppet valve seat on the side thereof opposite said bore, an exhaust port connected to said second chamber, and a spool valve comprising a sealing member carried by said stem and movable from a position separated from said bore and within said first chamber when said stem is in its first position to a position within said bore when said stem is in its second position, said poppet valve being movable to a position within said second chamber when said stem is in its second position.

2. The combination according to claim 1, said valve body being further provided with a first chamber on the side of said bore opposite said poppet valve seat and surrounding said stem, a fluid inlet port connected to said chamber, a working port connected to said bore, a second chamber connected to said poppet valve seat on the side thereof opposite said bore, and an exhaust port connected to said second chamber.

3. The combination according to claim 2, said first chamber comprising a second bore having a diameter larger than that of said first bore, and a sealing member carried by said stem within said second bore.

4. In combination, a solenoid having a core and a T-shaped armature, said core and armature having abutting surfaces movable between a separated position when the solenoid is deenergized and in engaged position when the solenoid is energized, a valve assembly comprising a valve stem aligned with a portion of said armature and movable thereby from a first to a second position when the solenoid is energized, a poppet valve carried by said stem on the end thereof remote from said armature connection, a valve body within which said stem is disposed, a poppet valve seat formed on said valve body and engageable by said poppet valve when the stem is in its first position, a bore within said valve body connected to said seat, a spool valve comprising a sealing ring carried by said stem and movable between a first position separated from said bore when said stem is in its first position and a second position fitting within said bore when the stem is in its second position, a second bore in said housing of larger diameter than said first bore, said second bore being connected with said first bore when said spool valve sealing ring is in its first position, a sealing member carried by said stem within said second bore, a fluid pressure inlet port connected to said second bore, a working port connected to said first bore, and an exhaust port connected to said poppet valve seat on the side thereof opposite said first bore.

References Cited in the file of this patent
UNITED STATES PATENTS

| | | |
|---|---|---|
| 2,409,517 | Schmit | Oct. 15, 1946 |
| 2,427,788 | Kehle | Sept. 23, 1947 |
| 2,646,820 | McLeod | July 28, 1953 |
| 2,971,090 | Piet et al. | Feb. 7, 1961 |